Aug. 12, 1969  P. S. GIOVAGNOLI  3,460,548
AUTOMATIC CAR WASHING APPARATUS
Filed Feb. 16, 1967  3 Sheets-Sheet 1
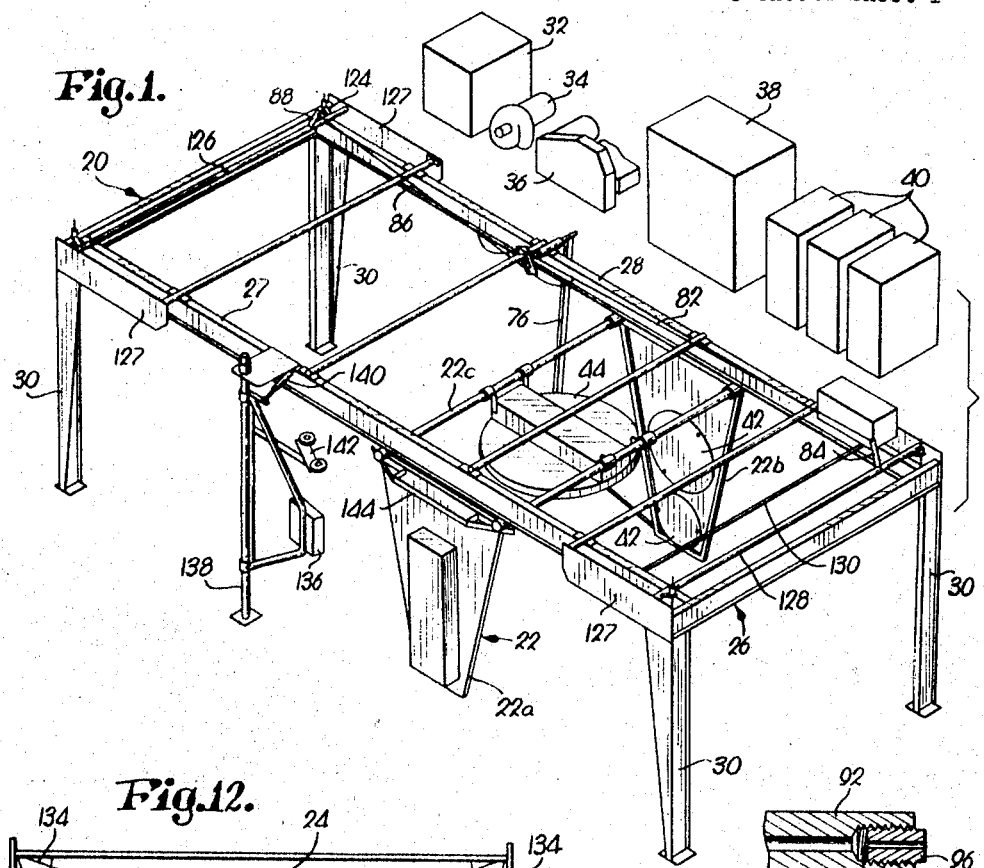
Fig.1.
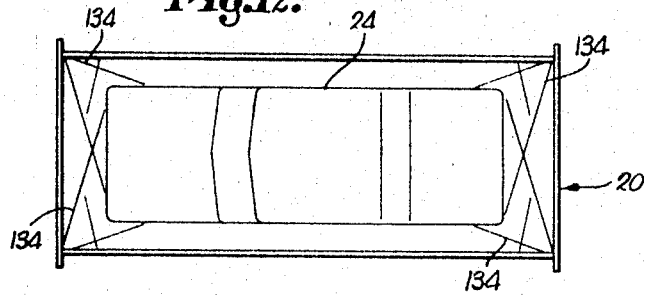
Fig.12.
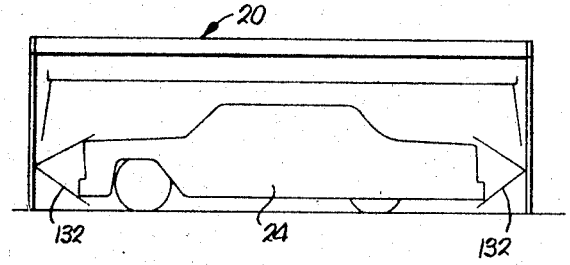
Fig.13.
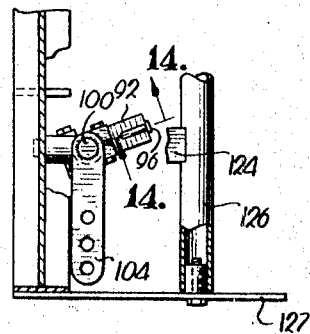
Fig.14.
Fig.11.
INVENTOR
Paul S. Giovagnoli
BY
Hovey, Schmidt, Johnson & Hovey.
ATTORNEYS.

Aug. 12, 1969  P. S. GIOVAGNOLI  3,460,548
AUTOMATIC CAR WASHING APPARATUS
Filed Feb. 16, 1967  3 Sheets-Sheet 2
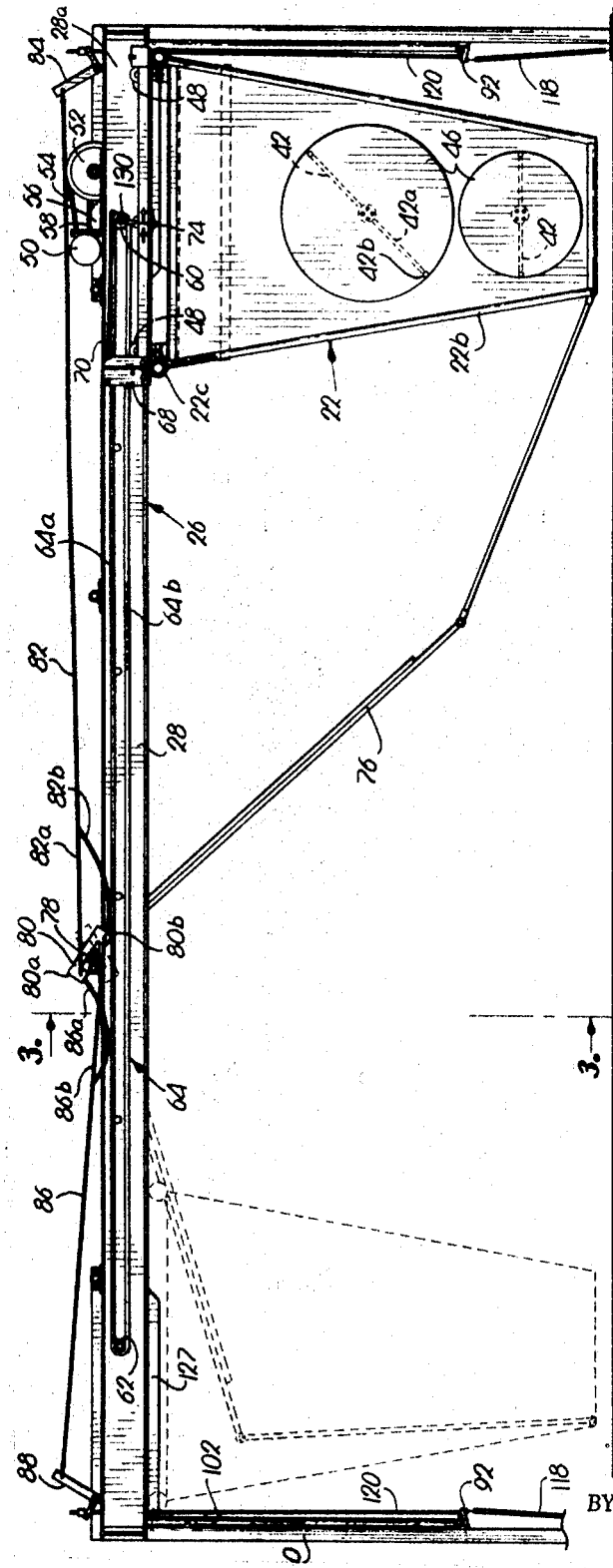
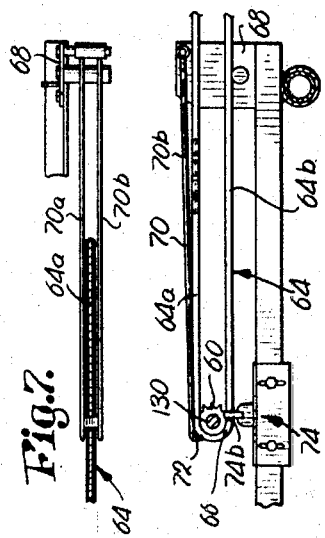
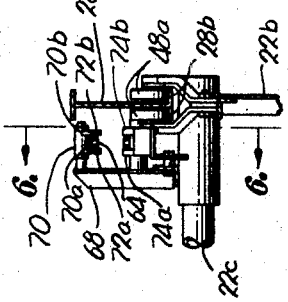
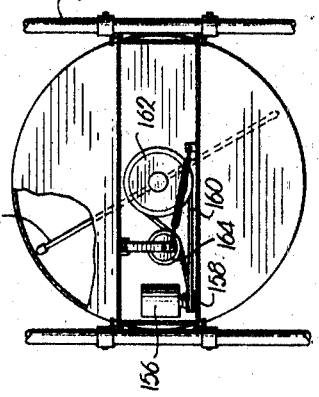
INVENTOR
Paul S. Giovagnoli
BY
ATTORNEYS.

Aug. 12, 1969  P. S. GIOVAGNOLI  3,460,548
AUTOMATIC CAR WASHING APPARATUS
Filed Feb. 16, 1967  3 Sheets-Sheet 3

INVENTOR
Paul S. Giovagnoli

BY
Hovey, Schmidt, Johnson & Hovey
ATTORNEYS.

United States Patent Office 3,460,548
Patented Aug. 12, 1969

3,460,548
AUTOMATIC CAR WASHING APPARATUS
Paul S. Giovagnoli, 4200 Birmingham Road,
Kansas City, Mo. 64117
Filed Feb. 16, 1967, Ser. No. 616,677
Int. Cl. B60s 3/04; B08b 3/12
U.S. Cl. 134—58                            7 Claims

ABSTRACT OF THE DISCLOSURE

A car washer having an elongated overhead frame mounted on corner standards. A U-shaped assembly is reciprocable along the frame in partial surrounding relationship to a vehicle being washed beneath the frame. The assembly is provided with a plurality of rotary washer units disposed for completely scanning the top and sides of the vehicle with high velocity, undispersed streams of fluid. A nozzle unit having a high velocity nozzle is disposed at each corner of the washer. Each corner nozzle unit is provided with mechanism for oscillating the same simultaneously about a vertical axis and a horizontal axis to scan proximal areas of the ends of the vehicle with high velocity, undispersed streams of fluid. The corner nozzle units are coupled with the U-shaped assembly and oscillated thereby during reciprocation of the assembly so that all portions of the vehicle are washed at the same time.

---

This invention relates to vehicle washing apparatus and particularly to improvements for automatic vehicle washers.

The films of dirt and grime which accumulate on the surfaces of a vehicle are difficult to remove therefrom and vigorous scrubbing action is often necessary to loosen such foreign particles so that the same may be rinsed away. This problem is magnified in automatic vehicle washers where a scrubbing action must be achieved through the use of mechanical devices. Heretofore, many automatic washing installations have employed large, rotatable brushes for contacting the surfaces to be washed thereby scrubbing the same. The vehicle must be aligned properly with respect to the brushes and furthermore, damage to the surfaces of the vehicle often results from the force exerted thereon during such brushing. Other such installations have employed broad pattern spray nozzles in an attempt to fully spray the vehicle with cleaning fluid. Such nozzles emit a fan-type or conically configured spray which does not possess a sufficient concentration of kinetic energy to properly scrub foreign particles from the surface of a vehicle.

Therefore, it is the primary object of the instant invention to provide an automatic vehicle washer wherein vigorous scrubbing action is achieved by directing high velocity streams of fluid at the surface of a vehicle being washed, whereby brushes and similar surface-engaging devices are rendered unnecessary. In this connection, it is an important aim of the invention to provide such a washer wherein a number of movable nozzles are utilized for controlled scanning of the entire outer surface of a vehicle with high velocity undispersed streams of fluid to the end that complete and thorough washing of the surface of the vehicle is accomplished in a short period of time.

A very important object of the invention is to provide a washer of the type described wherein all of the fluid directing nozzles are functionally interconnected in a manner to provide an integrated vehicle washing operation.

Another very important object of the instant invention is the provision of such an automatic vehicle washer which traverses the surface of a vehicle being washed without the necessity for moving the vehicle during the washing process. The instant invention provides overhead structure whereby movement of the same is not interfered with by inadvertently placed objects lying on the floor.

Yet another important object of the instant invention is to provide such a washer wherein high velocity, undispersed streams of fluid simultaneously traverse the surfaces of the vehicle along a pair of separate paths whereby the entire extent of each of the surfaces is scanned by the streams of fluid projected thereagainst. In this respect, an important aim of the instant invention is to direct such high velocity, undispersed streams of fluid against a vehicle disposed within the trajectory of the stream in a pair of separate patterns.

Yet a further object of the invention is the provision of a fully automatic vehicle washer wherein the entire outer surface of the vehicle is rapidly and completely washed free of dirt and grime accumulated thereon upon actuation of the washer by the opertaor of the vehicle while he remains seated in the vehicle and without movement of the latter during the washing process.

Still another object of the present invention is the provision of a washer of the type described wherein the top, sides and ends of the vehicle are completely traversed by high velocity, undispersed streams of fluid directed thereagainst from a series of moving, high velocity nozzles in a manner to peel tightly engaged dirt and grime therefrom.

In its broadest aspects, the instant invention provides vehicle washing apparatus wherein fluid is directed against the surface of a vehicle by a series of high velocity, shiftable nozzles operable to completely traverse a substantial portion of the surface area of the vehicle with a plurality of concentrated, undispersed streams of fluid.

In the drawings:

FIGURE 1 is a perspective view showing the layout of a vehicle washer embodying the principles of the instant invention and schematically illustrating the accessories preferably interconnected therewith;

FIG. 2 is an enlarged, cross-sectional, elevational view of the vehicle washer illustrated in FIG. 1;

FIG. 4 is a top plan view of the overhead rotary top washer;

FIG. 5 is an enlarged detail view of the upper right-hand corner of FIG. 3;

FIG. 6 is a cross-sectional view taken along line 6—6 of FIG. 5;

FIG. 7 is a top plan view of the components illustrated in FIG. 6;

FIG. 11 is a cross-sectional plan view looking downwardly at the apparatus illustrated in FIG. 9, certain components having been omitted for increased clarity;

FIG. 12 is a reduced, top plan view of the vehicle washer shown in FIG. 1, illustrating the horizontal dimensions of the extent of coverage of the high velocity streams during a complete cycle of the washer;

FIG. 13 is a side elevational view of a reduced scale of the washer illustrated in FIG. 1 showing the vertical dimensions of the spray patterns; and FIG. 14 is an enlarged, cross-sectional, fragmentary view of the nozzle unit of FIGS. 9 and 11 illustrating the nozzle details for projecting a high velocity stream of fluid at a vehicle being washed.

Figure 3:
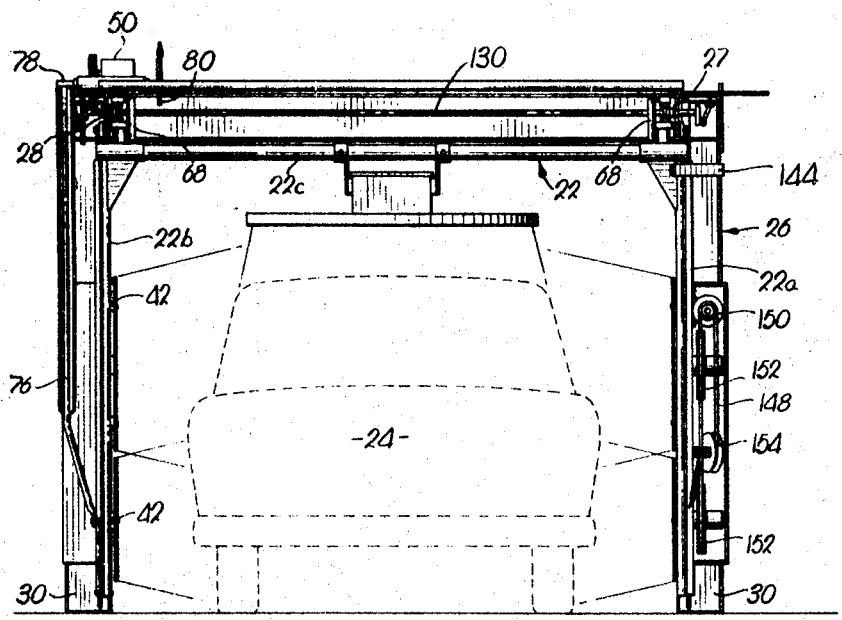
FIG. 3 is a cross-sectional view taken along line 3—3 of FIG. 2.

A car or vehicle washer embodying the principles of the instant invention is broadly designated by the numeral 20 and is illustrated in FIG. 1. Washer 20 includes an inverted, U-shaped washing assembly 22 adapted to partially surround a vehicle 24 as can be seen viewing FIG. 3.

Means in the nature of an open frame 26 is provided for supporting assembly 22 for reciprocable travel fore-and-aft of vehicle 24 thereabove. Frame 26 includes a pair of tracks 27 and 28 disposed in spaced-apart relationship on opposite sides of frame 26 extending longitudinally of the latter and a plurality of spaced standards 30 supporting tracks 27 and 28 as can be seen viewing FIG. 1. Washer 20 is provided with accessory equipment including a surge tank 32, a blower 34, a pump 36, a heater 38 and tanks 40 for storing wax, detergent and detergent concentrate. This accessory equipment is connected with washer 20 through a plurality of conduits arranged in a manner well known to those skilled in the art, these conduits having been omitted from FIG. 1 for increased clarity.

Assembly 22 includes opposed, downturned leg sections 22a and 22b and an overhead section 22c interconnecting leg sections 22a and 22b. Each leg section 22a and 22b mounts a pair of vertically spaced rotary washer units 42, while section 22c mounts a single rotary washer unit 44. Thus, assembly 22 is provided with a number of washer units 42 and 44 for directing high velocity, undispersed streams of washing material against vehicle 24. Each unit 42 is provided with a circular disc 46 rotatable therewith. Discs 46 provide a safety shield for arms 42a of unit 42 and it is to be noted that the nozzles 42b of unit 42 project through appropriate openings in disc 46 as best illustrated in FIG. 2.

Tracks 27 and 28 are substantially identical in configuration and thus only track 28 will be described. Track 28 is I-shaped in transverse cross-sectional configuration presenting a central web 28a and a pair of opposed, outturned flanges 28b which can best be seen viewing FIG. 5.

Assembly 22 is mounted on track 27 and 28 through the medium of a plurality of trolleys 48 disposed at each corner of section 22c. Each trolley 48 comprises a pair of opposed wheels 48a disposed on opposite sides of web 28a and operatively engaging flanges 28b as can be seen viewing FIG. 5. Thus, assembly 22 is shiftable in either direction along the entire length of tracks 27 and 28.

Power means including an electric motor 50 is coupled with unit 22 for actuating the latter and reciprocating the same along track 28. Motor 50 drives transmission means 52 through the medium of a V-belt 54 and transmission 52, in turn, drives a sprocket wheel 56 through a chain 58. A small sprocket 60 is mounted on a shaft extending from sprocket 56 through web 28a. Hence, sprocket 60 is rotated upon actuation of motor 50. An idler sprocket 62 is mounted adjacent the left-hand end of track 28 as can be seen viewing FIG. 2, and an endless chain 64 is looped around sprockets 60 and 62. An extension 66 extends laterally from chain 64 as can be seen viewing FIG. 6. Assembly 22 is provided with a bracket 68 extending upwardly from section 22c adjacent section 22b as can be seen viewing FIGS. 2 and 5. An elongated hook 70 extends rightwardly from bracket 68, viewing FIG. 2, and is provided with a downturned terminus 72 disposed for engagement by extension 66 as the latter moves rightwardly along the upper stretch 64a of chain 64, while chain 64 moves in a generally clockwise direction during the rotation of sprocket 60 in a clockwise direction by motor 50. It can be seen viewing FIG. 5 that hook 70 comprises a pair of identical side-by-side sections 70a and 70b having corresponding termini 72a and 72b disposed on opposite sides of chain 64.

A yoke 74 is mounted on assembly 22 adjacent termini 72a and 72b. Yoke 74 is provided with a pair of upwardly extending shoulders 74a and 74b disposed on opposite sides of the lower stretch 64a of chain 64 at a location for engagement by extension 66 during leftward movement of the latter (rightward viewing FIG. 6). Thus, it can be seen viewing FIG. 2, that during the rotation of sprocket 60 in a clockwise direction, extension 66 engages shoulders 74a and 74b to move assembly 22 leftwardly as extension 66 moves leftwardly along stretch 64b. After assembly 22 has been moved to its extreme left-hand position indicated by dashed lines in FIG. 2, extension 66 separates from shoulders 74a and 74b and engages with termini 72a and 72b to move unit 22 toward the right as extension 66 moves rightwardly along stretch 64a of chain 64.

An elongated, articulated utility boom 76 has one end thereof pivotally mounted on the lower left-hand corner of section 22b. The opposite end of boom 76 is pivotally mounted on frame 26. A rotatable shaft 78 is rigid with boom 76 and mounts a crank arm 80 for rotation therewith as shaft 78 is reciprocably rotated during movement of assembly 22 between its extreme positions and opposite ends of frame 26. A Y-shaped cable 82 is connected between arm 80 and a lever 84 at the right-hand end of frame 26. Cable 82 has a pair of stretches 82a and 82b connected with ends 80a and 80b of arm 80 respectively. Similarly, a cable 86 having stretches 86a and 86b extends between arm 80 and a lever 88 at the left-hand end of frame 26.

A washing apparatus 90 is provided at each standard 30 for directing a high velocity, undispersed stream of washing fluid at respective ends of vehicle 24. Apparatus 90 includes a nozzle unit 92 having an aperture 94 for receiving fluid under pressure and a nozzle 96 adapted to project the high velocity stream of fluid longitudinally of nozzle 92. Nozzle unit 92 is mounted on structure 98 for oscillation within a first path of travel about an upright axis. Structure 98 includes an elongated, upright member 100 mounted for rotation about its longitudinal axis within a housing 102. A lateral extension 104 is rigid with member 100 for rotation therewith. A shaft 106, rotatable with idler sprocket 62 extends through web 28a of track 28 and mounts a rotatable device in the nature of a crank arm 108 for rotation therewith as idler sprocket 62 is rotated. A link 110 is pivotally mounted on arm 108 and extension 104 for oscillating member 100 as arm 108 rotates about the axis of shaft 106, as can best be seen in FIG. 9. Thus, nozzle unit 92 is oscillated about an upright axis in response to the movement of chain 64 and the resultant travel of assembly 22. Mechanism 112 is provided for mounting nozzle unit 92 on structure 98 for reciprocation within a second path of travel about a horizontal axis. Mechanism 112 includes hinge means 114 on the lower end of member 100 including a horizontal hinge pin 116 interconnecting nozzle unit 92 and member 100.

Figure 9:
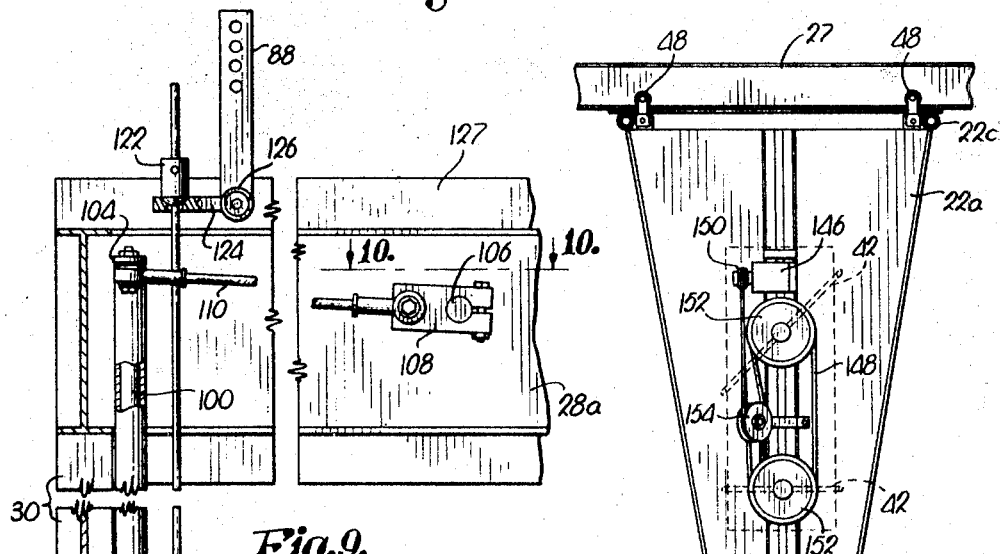
FIG. 9 is an enlarged, detail view partially in cross section of the washing apparatuses disposed at each corner of the vehicle washer.

Nozzle unit 92 is provided with yieldable means in the nature of a coil spring 118 for urging nozzle unit 92 about the axis of pin 116 in a clockwise direction viewing FIG. 9. An elongated rod 120 is pivotally connected with nozzle unit 92 and extends upwardly therefrom. A stop 122 is mounted adjacent the upper end of rod 120 in engagement with a lifter 124 extending laterally from a shaft 126, the latter being pivotally mounted at opposite ends thereof by respective brackets 127 disposed adjacent respective tracks 27 and 28. Lever 88 extends upwardly from shaft 126 as can be seen viewing FIG. 9. It is to be understood that a lifter 124 is provided for each apparatus 90 and lever 84 extends upwardly from a shaft 128 functionally identical with shaft 126, disposed at the right-hand end of washer 20 viewing FIG. 1. Manifestly, the structure of ecah apparatus 90 is functionally identical with the structure described above.

It can thus be seen that structure 98, lateral extension 104, shaft 106, crank arm 108 and sprocket 62 act to oscillate unit 92 in a manner such that one complete oscillation occurs for each revolution of sprocket 62.

Boom 76, arm 80, cables 82 and 86, levers 84 and 88, shafts 126 and 128, lifters 124, stops 122, and rods 120 present means for operably interconnecting assembly 22 with each nozzle unit 92 for reciprocation of the latter about the axes of pins 116 in response to the travel of assembly 22 and simultaneously with oscillation of nozzle unit 92. In this respect, it is to be understood that sprocket wheel 56 and sprocket 60 are mounted on a common shaft 130 extending between tracks 27 and 28. Reciprocation of nozzle unit 92 will thus occur at a considerably slower rate than oscillation thereof, one complete reciprocation occurring for each complete cycle of movement, fore and aft, of assembly 22. The combined effect of the operation of the above described components is to move nozzle unit 92 and hence a stream of water directed therethrough in a serpentine pattern across a vehicle being washed.

Drive mechanism for assembly 22, identical with that described above with relationship to track 28, is provided adjacent track 27. Opposed ends of shaft 130 extend outwardly beyond tracks 27 and 28 and mount arms similar to arm 108 thereon for oscillating the nozzle unit 92 disposed adjacent thereto. Furthermore, a stub shaft similar to shaft 106 extends through track 27 at the end thereof adjacent shaft 126. Hence, means are provided for operably interconnecting assembly 22 with each nozzle unit 92 for oscillation of the latter about the axes of members 100 in response to the travel of assembly 22 along tracks 27 and 28. Therefore, it can be seen that during the movement of assembly 22 fore-and-aft of vehicle 24, nozzle units 92 are reciprocated in a vertical direction while projecting a high velocity, undispersed stream of fluid at vehicle 24 in a first pattern designated by the numeral 132. Furthermore, while nozzle units 92 are reciprocated vertically, the same are oscillated in a horizontal direction for projecting such high velocity streams of fluid at the ends of vehicle 24 in the patterns designated by the numeral 134 in FIG. 12.

Washer 20 is adapted for fully automatic washing of a vehicle such as 24 while the operator of the vehicle remains seated in his normal driving position. Viewing FIG. 1, the operator of a vehicle to be washed would enter washer 20 through the left-hand end thereof and position the vehicle such that control box 136 is adjacent the operator's window. Upon depositing appropriate coinage in control box 136, washer 20 will be actuated, whereupon assembly 22 will travel along tracks 27 and 28 fore and aft of the vehicle being washed.

Box 136 is swingably mounted on a support 138 and a piston and cylinder assembly 140 provides means for shifting box 136 out of the path of assembly 22 during fore-and-aft travel of the latter. In addition to piston and cylinder assembly 140, in case the latter is rendered inoperable for any reason, a wheeled dolly 142 is mounted for swinging with box 136. Dolly 142 is positioned to be engaged by a camming track 144 carried by assembly 22. Viewing FIG. 1, it can be seen that during the movement of assembly 22, track 144 will contact dolly 142 to swing control box 136 out of the path of travel of assembly 22.

Each section 22a and 22b is provided with mechanism for rotating washer units 42 thereon. The mechanism on section 22b is identical with the mechanism for section 22a and, therefore, only the mechanism related to section 22b will be described.

Figure 8:
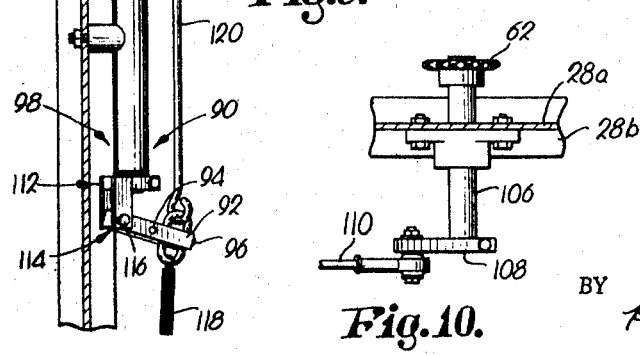
FIG. 8 is an elevational view illustrating the rotary side washers.
Figure 10:
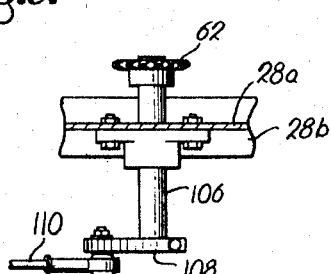
FIG. 10 is a cross-sectional view taken along line 10—10 of FIG. 9.

An electric motor 146 drives a belt 148 which is looped around the driver wheel 150 of motor 146 as well as driven sheaves 152 rotatable with respective washer units 42. A spring-loaded idler pulley 154 is provided for tightening belt 148, as well as changing the direction of the same, to present the configuration shown in FIG. 8 whereby both of the washer units 42 on section 22b are rotated in the same direction.

The washer units 44 on section 22c are rotated through the medium of an electric motor 156 having a driven sheave 158 thereon coupled with a belt 160 looped around a driven pulley 162 rotatable with washer unit 44. A spring-loaded idler pulley 164 is disposed as indicated in FIG. 4 to control the tension on belt 160.

Each of the units 92, 42 and 44 are coupled with pump 36 through a plurality of conduits (not shown) whereby high velocity streams of washing fluid are projected toward a vehicle such as 24. Upon actuation of washer 20 by the deposit of appropriate coinage in control box 136, pump 36, and motors 50, 146 and 156 are energized. Thus, the sides and top of vehicle 24 are scanned by the high velocity streams of washing fluid projected thereagainst by the rotary washer units 42 and 44 which traverse the entire surface of vehicle 24 as assembly 22 travels fore and aft of vehicle 24. The ends of vehicle 24 are vigorously scrubbed by the high velocity streams of washing fluid projecting from nozzle units 92 as the latter are oscillated vertically and reciprocated horizontally, whereby the washing fluid sweeps across the end surface of vehicle 24 which is within the trajectory of the high velocity streams of fluid discharging from each nozzle unit 92, in a pair of separate patterns 132 and 134.

Manifestly, washer 20 operates to scan the entire outer surface of an automobile being washed thereby with high velocity, undispersed streams of washing fluid. Furthermore, the novel action of nozzle units 92 through the simultaneous vertical reciprocation and horizontal oscillation of the same, projects washing fluid, at a high velocity, toward a substantial portion of the surface of a vehicle such as 24 being washed. Hence, it can be seen that all of the objects, aims and purposes of the instant invention have been fulfilled in a substantial sense.

Having thus described the invention, what is claimed as new and desired to be secured by Letters Patent is:

1. In a vehicle washer, a washing apparatus including:
  a nozzle unit, said unit having means for receiving a liquid under pressure and nozzle means for discharging liquid therefrom in a high velocity, undispersed stream;
  structure supporting said nozzzle unit for oscillation within a first path of travel;
  mechanism mounting said nozzle unit on the structure for reciprocation within a second path of travel during oscillation of the nozzle;
  first means operably connected with said structure for oscillating said nozzle unit at a predetermined rate;
  second means operably connected with said mechanism for reciprocating said nozzle unit at a different rate than the oscillation thereof;
  connecting means between said first and said second operating means for effecting simultaneous oscillation and reciprocation thereof to cause the stream of liquid ejected from the nozzle unit to scan the surface of a vehicle within the trajectory of the stream in a serpentine pattern;
  a washing assembly adapted to partially surround said vehicle when the same is in said trajectory of the liquid stream from said nozzle;
  components for supporting the assembly for travel along the vehicle fore and aft thereof, said assembly being provided with a number of rotary washer units mounted thereon for travel therewith for directing high velocity streams of washing material against the vehicle during said travel of the assembly;
  said mechanism including means operably interconnecting the assembly with the nozzle unit for reciprocation of the latter in response to said travel of the assembly; and said structure including means operably interconnecting the assembly with the nozzle unit for oscillation of the latter in response to said travel of the assembly.

2. The invention of claim 1,
  said structure including an elongated member having an upright, longitudinal axis;

said mechanism coupling the nozzle unit with the the member, whereby said oscillation is about said axis.

3. The invention of claim 1, said first means including
a rotatable device;
a lateral extension on the member; and
a link interconnecting the device and the member.

4. The invention of claim 1, said second means including:
spring means urging said nozzle in a first direction;
cable means for moving said nozzle in a second direction; and
connecting means joining said cable means to said nozzle.

5. The invention of claim 1,
said components for supporting the assembly including an open frame having track means for guiding the assembly above the vehicle, and a plurality of spaced standards supporting the track means,
there being one of said washing apparatuses adjacent each standard respectively.

6. The invention of claim 5,
power means coupled with said assembly for actuating the latter;
a control for said power means operably connected therewith and disposed adjacent said frame; and
means for engaging said assembly and thus shifting the control out of the path of travel of said unit upon actuation of the control.

7. In a vehicle washer, the combination of:
a generally rectangular frame unit of dimensions to receive a vehicle to be washed and having upright standards at the corners thereof;
a nozzle unit for each standard having an elongated body provided with a nozzle at one end thereof for axial discharge of liquid under pressure therefrom in the form of a high pressure, undispersed stream;
structure supporting each of said nozzle units adjacent a respective standard for oscillation about a corresponding vertical axis remote from the nozzle thereon and in disposition to cause each nozzle to discharge a stream of liquid therefrom inwardly of the frame unit toward an adjacent corner portion of a vehicle disposed within the frame unit;
mechanism mounting each of the nozzle units on a corresponding structure for reciprocation about a respective horizontal axis remote from the nozzle thereon during oscillation of the respective nozzle unit;
first means operably connected with each of the structures for oscillating the nozzle unit supported thereby at a predetermined rate;
second means operably connected with each of said mechanisms for reciprocating respective nozzle units at a different rate than the oscillation thereof;
connecting means between said first and second operating means for respective nozzle units to effect simultaneous oscillation and reciprocation of each nozzle to cause the stream of liquid ejected therefrom to scan the adjacent surface of a vehicle within the trajectory of the stream in a serpentine pattern;
a washing assembly shiftably mounted on the frame unit for movement along the sides of a vehicle positioned therewithin and operable to direct cleansing streams of water against the vehicle sides during movement of the assembly;
means coupled to said assembly for shifting the same; and
means for effective oscillation and reciprocation of the nozzle units simultaneously and in conjunction with operation of the assembly.

References Cited

UNITED STATES PATENTS

| 3,190,297 | 6/1965 | Austin et al. | 134—123 |
| 3,210,010 | 10/1965 | Delapena | 134—181 XR |
| 3,259,138 | 7/1966 | Heincke | 134—45 |
| 3,261,369 | 7/1966 | Thiele | 134—123 |
| 3,288,109 | 11/1966 | Smith et al. | 134—123 XR |
| 3,315,691 | 4/1967 | Widner | 134—123 XR |
| 3,339,563 | 9/1967 | Ordonez | 134—123 *XR* |
| 3,339,565 | 9/1967 | Williams | 134—123 XR |

FOREIGN PATENTS 686,716   1/1953   Great Britain.

ROBERT L. BLEUTGE, Primary Examiner

U.S. Cl. X.R.

134—123, 181; 239—227